United States Patent [19]

Hesse et al.

[11] 4,010,163
[45] Mar. 1, 1977

[54] PHENOLIC RESINS

[75] Inventors: Wolfgang Hesse, Wiesbaden; Paul Jacobi, Wiesbaden-Biebrich, both of Germany

[73] Assignee: Hoechst Aktiengesellschaft, Frankfurt, Germany

[22] Filed: Mar. 24, 1975

[21] Appl. No.: 561,339

[30] Foreign Application Priority Data

Mar. 23, 1974 Germany .................. 2414097

[52] U.S. Cl. .................. 260/29.3; 260/57 A; 260/59 R
[51] Int. Cl.$^2$ .................. C08G 2/34; C08G 8/10; C08L 61/10
[58] Field of Search ............... 260/29.3, 57 A, 59 R

[56] References Cited

UNITED STATES PATENTS

| | | | |
|---|---|---|---|
| 2,470,130 | 7/1949 | Bender et al. | 260/59 R |
| 2,885,386 | 5/1959 | Straka et al. | 260/57 A |
| 3,419,527 | 12/1968 | Akutin et al. | 260/57 A |
| 3,476,707 | 11/1969 | Culbertson et al. | 260/57 A |
| 3,766,100 | 10/1973 | Meyer-Stoll et al. | 260/29.3 |
| 3,823,103 | 7/1974 | Harding | 260/29.3 |

OTHER PUBLICATIONS

Modern Plastics Encyclopedia 1968 (McGraw—Hill) (N.Y.) (Sept. 1967) p. 495.
Whitehouse et al., Phenolic Resins (2nd ed.) (Iliffe Books Ltd.) (London) (1967), pp. 85—86.

*Primary Examiner*—Donald E. Czaja
*Assistant Examiner*—H. H. Fletcher
*Attorney, Agent, or Firm*—Littlepage, Quaintance, Murphy & Dobyns

[57] ABSTRACT

A new process for the preparation of hardenable phenolic resins which are substantially free from unreacted phenol and unreacted formaldehyde and which liberate at most only trace quantities of formaldehyde on hardening comprises reacting novolaks containing methylene bridges which are substantially free from unreacted phenol with formaldehyde in the presence of from 0.15 to 1 equivalent (based on the number of phenolic hydroxy groups) of a basic catalyst at 20° to 70° C. The phenolic resin products may be used wherever conventional phenolic resins have previously been used, an important application being the preparation of aqueous emulsions for use as coating materials and impregnating agents.

10 Claims, No Drawings

PHENOLIC RESINS

The invention relates to a process for the preparation of hardenable phenolic resins which are substantially free of unreacted phenol and unreacted formaldehyde and which do not liberate any free phenol and liberate at most only trace quantities of formaldehyde on hardening.

Self-hardening phenolic resol resins prepared by reacting phenol and formaldehyde are well known. These resins however always contain certain amounts of free phenol and/or free formaldehyde and moreover liberate these components on hardening. During hardening, some formaldehyde which is bound to the resin may also be liberated if it is not freely contained in the resin beforehand, e.g. as a result of a subsidiary supply of phenol.

In a particular embodiment according to Baekeland novolaks have been manufactured with formaldehyde cleaving compounds, e.g. hexamethylene tetramine, to yield moulding materials. The addition of formaldehyde to novolaks in the presence of alkaline catalysts was proposed in the literature some time ago. By carrying out this process in several stages improvements in the properties of the products as moulding resins have been achieved. Such resins have been used in the production of moulded articles which may be finished manually.

Novolaks which are chiefly cross-linked in the ortho position generally have special properties since the hydrogen in the p-position is extremely reactive to formaldehyde. Owing to the formation of methylene bridges, formaldehyde subsequently added to the resin is incompletely reacted and gelation of the mixture results.

Benzyl ether resins of the novolak type are also known, which are cross-linked in the o-position and which derive the formaldehyde required for exclusive cross-linking in the p-position from the fact that the benzyl ether bond cleaves when heated. Heating of the resin in the presence of weak acids also results in the formation of formaldehyde by cleavage of methylol groups which may be present in the resin, whereby improved cross-linking may be obtained.

In addition, attempts have been made, to reduce the quantity of unreacted starting materials and improve the yield of resin, in the preparation of self-hardening phenol resins, by carrying out the reaction in two stages, namely by first preparing a novolak from formaldehyde and phenol with a molar ratio of phenol to formaldehyde of from 1:0.4 to 1:0.85, and subsequently adding formaldehyde thereto in the presence of an alkaline catalyst under reflux conditions so that a final molar ratio of phenol to formaldehyde of from 1:1 to 1:1.25 is obtained. However, only limited quantities of formaldehyde can be added to the novolak in this way. The excessively high reaction temperature obtained when greater quantities of formaldehyde are used results in gelation of the mixture.

Furthermore, it is known to condense mixtures of phenol and substituted phenols with aldehydes in the presence of alkaline-reacting catalysts in such a way that initially at 130° C less than one mole of aldehyde is added and subsequently after the reaction mixture has cooled to about 100° C, so much aldehyde is added that an overall excess of aldehyde is reacted. The reaction product is a resinous condensation product which may be converted into an infusible state by heating.

In the hitherto known processes for preparing novolaks, the formation of methylol groups has been neither sought after nor achieved. Owing to the choice of the type of catalyst, the concentration of the catalyst and the reaction temperature, the reaction conditions bring about a partial or total condensation of the methylol groups first formed. The reaction is controlled via the condensation level of the resin formed. Consequently resins are obtained which still contain free formaldehyde and do not contain the majority of the bound formaldehyde in the form of methylol groups. They have a high condensation level which can lead to partial gelation. The usefulness of the resins is thus considerably diminished since too much dilution is required for use in coatings and as impregnation agents. On processing, non-bound phenol and unreacted formaldehyde are liberated.

The liberation of cleavage products in the hardening of phenolic resins is a serious technical problem which has not yet been overcome. At present the cleavage products formed during hardening have to be burnt at considerably industrial expense.

According to the present invention we now provide a process for the preparation of a hardenable phenolic resin which is substantially free from unreacted phenol and unreacted formaldehyde and which liberates at most only trace quantities of formaldehyde during a hardening process which comprises reacting (A) a novolak containing methylene bridges which is not predominantly cross-linked at the ortho-positions and which is substantially free from unreacted phenol with (B) formaldehyde in the presence of from 0.15 to 1, preferably from 0.2 to 0.8 equivalent (based on the number of phenolic hydroxy groups) of a basic catalyst a temperature of from 20° to 70° C, preferably from 40° to 60° C.

Advantageously the phenolic and/or methylol hydroxy groups in the resin are subsequently at least partially etherified.

The hardenable phenolic resins according to the present invention may if desired be converted into aqueous emulsions, which aqueous emulsions constitute a further feature of the invention. The phenolic resin optionally in admixture with one or more plasticizers is emulsified with water, if necessary with the aid of emulsifiers, protective colloids or other conventional emulsifier adjuvants.

The novolak resin is a condensation product of formaldehyde and at least one trifunctional phenol optionally in admixture with one or more substituted phenols, preferably bifunctional alkylphenols, linked by methylene bridges. Where the novolak resin is derived from a mixture of phenols, the said mixture preferably contains at least one mol of phenol per mol of substituted phenols. It is important that there are sufficient hydrogen atoms in the ortho- and para- positions to the phenolic hydroxy groups available for reaction with formaldehyde to produce novolaks of the necessary structure for use in the process according to the invention. The terms "bifunctional and trifunctional" used herein in relation to the phenol component refer to the number of reactive hydrogen atoms in the ortho- and/or para- positions to the phenolic hydroxy group which are available for reaction with formaldehyde.

Suitable tri- and higher functional phenols which may be used to prepare the novolak include for example phenol itself, m-cresol and bis-phenols such as 4,4'-diphenylolmethane and diphenylolpropane. Examples of bifunctional alkyphenols which may be used include phenols substituted with one or more straight-chained branched, cyclic or polycyclic alkyl, aralkyl or aromatic hydrocarbon group with up to 18 carbon atoms, e.g. one or more propyl, butyl, amyl, hexyl (including cyclohexyl), octyl, nonyl, dodecyl, benzyl, cumyl, dicyclopentadienyl or styryl groups. Iso-alkyl and tertiary butyl substituted phenols are preferred.

The condensation level of the novolaks may vary within wide limits. Preferably, the molar ratio of phenol(s) to formaldehyde in the novolak is from 1:0.1 to 1:0.8, more preferably from 1:0.2 to 1:0.7. The unreacted phenol content of the novolak is preferably not more than 1.5% by weight, more preferably less than 0.5% by weight. If necessary the novolak (A) must be freed from unreacted phenol before the reaction with formaldehyde according to the invention to below the desired level.

When reacting the novolaks with formaldehyde in the presence of bases, it is essential to eliminate condensation reactions. This can be achieved by selection of the quantity and type of catalyst and by controlling the reaction temperature. Advantageously, inorganic bases, preferably potassium hydroxide and sodium hydroxide, are used as catalysts. The formation of methylol groups by the addition of formaldehyde occurs quantitatively. After the reaction, no formaldehyde can be detected, even if the quantity of formaldehyde used is relatively high. In general in the phenolic resin products on average from 2 to 2½ of the three o- and p-positions in the phenolic nuclei are occupied by methylol groups or methylene bridges or alkyl or other substituents.

The novolak resin used contains phenolic nuclei cross-linked via methylene bridges at both the ortho- and para-positions. Such resins may be obtained for example by reacting phenol and formaldehyde in the presence of acids. Predominantly o-structured novolaks, as described hereinbefore are not suitable.

The phenolic resins prepared by the process according to the invention may be subjected to hardening and other reactions. Thus for example the phenolic hydroxy groups and/or the methylol hydroxy groups may be partially or completely etherified.

Etherification of the phenolic hydroxy groups may for example be effected by reaction with in particular epoxy compounds for example ethylene oxide, propylene oxide, styrene oxide and epoxy resins, e.g. the diglycidyl ether of diphenylolpropane, and also halohydrins such as epichlorohydrin, chlorohydrin and dichlorohydrin. These etherification agents are conveniently reacted in the presence of the basic catalysts used for methylolation. Etherification of the phenolic hydroxyl groups may also be effected according to Williamson's method, with alkyl and alkylene halides such as methyl chloride, methylene chloride, ethylene chloride, tert.-butyl chloride, benzyl chloride, xylylene dichloride, allyl chloride and 2,2-dichlorodiethyl ether, with halogenated fatty acids such as chloroacetic acid, $\alpha$-chloropropionic acid and $\beta$-chloroproionic acid, or with halogenated carbonyl compounds such as chloroacetone, bromoacetone and dichloroacetone. In general the etherification reaction is effected in the presence of a more than equimolar excess (referred to the quantity of halide) of the basic catalyst in order to ensure that there is always an excess of the base. Preferably sodium hydroxide solution or potassium hydroxide solution are afterwards added to the reaction mixture if other catalysts have been used earlier.

Etherification of the methylol hydroxyl groups which may be carried out either in the absence of a catalyst or in the presence of an acid catalyst such as phosphoric acid, oxalic acid or lactic acid, is preferably effected by means of an alcohol, for example methanol, ethanol or propanol, or particularly butanol, ethylene glycol or glycerol.

It is not advisable to etherify the phenolic hydroxyl groups before reacting the novolaks with formaldehyde, because then the reactivity of the active hydrogen atoms in the phenol nucleus to formaldehyde is reduced.

If the etherified phenolic resin is to be subsequently converted into an aqueous emulsion, any unreacted alcohol or solvent which may be present in the resin should be removed prior to emulsification for example by distillation, steam distillation or extraction with water.

The phenolic resins according to the present invention which are substituted by methylol groups do not split off formaldehyde or split off only trace quantities on hardening. They are distinguished by outstanding solubility in polar and non-polar solvents and by very good compatibility with many other synthetic resins. A precondition for these properties is the absence of higher condensation products which might result for example, from condensation of two methylol groups in the novolak with the formation of a dimethylene ether bridge.

The phenolic resins according to the invention have a wide variety of applications. They may be hardened thermally e.g. at temperatures from 110° to 220° C or with the aid of acid catalysts at ambient temperature or at slightly elevated temperatures. Thus they may, for example, be used as hardenable components in synthetic resin adhesives. They may also be used wherever phenolic resins have previously been applied e.g. in solvent varnishes, water-soluble varnishes, emulsions or impregnating agents, for vulcanizing rubber, in hardenable moulding materials, or for binding textile fibres, mineral fibres, glass fibres or the like. They may be used either alone or combined with plasticising substances such as epoxy resins, fatty oils, alkyd resins or vinyl polymers. They may also be used as pre-condensates by partial reaction with the above-named substances before actual use. If the novolaks substituted with methylol groups are reacted with halogenated carboxylic acids, resins are yielded which become water soluble when at least partially reacted with salt-forming compounds. Since the resins according to the invention may be hardened at ambient temperature with the aid of acid catalysts they may be used in cement compositions for manufacturing ceramic floor coverings or wall coverings, or in the construction of chemical apparatus.

The novolaks modified according to the invention may, however, also be used without subsequent hardening.

They are capable of forming complex compounds with oxides of polyvalent metals such as magnesium, zinc and cadmium, which complexes may be used to reinforce adhesives based on polychloroprene, polyurethane or natural or synthetic rubber. However, the novolaks modified according to the invention may also act as reinforcing agents in the above-named adhesives, even without complex formation. They serve to increase stickiness of the adhesive and consequently to lengthen the working time of solvent adhesives.

Preferred plasticizers for use in the preparation of the aqueous emulsions according to the invention include epoxy resins, polyurethane resins, polyamides, fatty oils, alkyd resins, polyvinyl acetates or polyvinylacetals. Advantageously the phenolic resins containing methylol groups or their etherification products may be pre-condensed with the plasticizers before emulsification.

Both anionic and cationic emulsifiers may be used to prepare the aqueous emulsions, but preferably non-ionogenic emulsifiers are used. In particular, known hydroxylalkylated alkylphenols, hydroxyalkylated alkylphenolnovolaks, hydroxyalkylated fatty acids and resin acids, hydroxyalkylated long-chain alcohols and hydroxyalkylated castor oil are used generally, in quantities of up to 20%, preferably up to 8% by weight, based on the resin component. The alkyl groups in all these substances are preferably straight — chained or branched alkyl groups having up to 18 carbon atoms, e.g. methyl, ethyl, propyl, butyl, amyl, hexyl, octyl, nonyl, and dodecyl groups. The hydroxyalkylation is conveniently effected using an alkylene oxide, preferably ethylene oxide, but also propylene or butylene oxide.

Protective colloids which may be used in the preparation of the emulsion includes, for example, polyvinylalcohol, vegetable gums, proteins, starch derivatives such as amylopectin, and water-soluble cellulose ethers such as carboxymethyl cellulose and methyl cellulose. Moreover, other water-soluble resins, which may strengthen the protective colloid activity, may also be added, for example alkyl, epoxy and acrylate resins made soluble by the addition of carboxyl groups, and oils. Preferably, polyvinyl alcohol is used as protective colloid, especially in combination with non-ionogenic emulsifiers.

The emulsion generally contains up to 60, preferably up to 55% of a dispersed phase, which consist of or comprises the phenolic resin according to the invention. The content of plasticizers in the emulsion may be up to 95% by weight referred to the combined weight of resin and plasticizers.

Generally, the ratio of phenolic resin to plasticizer varies from 95:5 to 5:95, preferably from 80:20 to 20:80.

The proportion of coherent phase corresponds to the dispersed phase.

The coherent phase consists mainly of water and may contain protective colloids and/or emulsifying adjuvants and wetting agents in dissolved form. It is also possible for the coherent phase to contain water-soluble synthetic resins which have no essential function as protective colloids but which become compatible with the components of the dispersed phase during processing and which have a favorable effect on the properties of the end product, e.g. with respect to additional plasticising, and also affect the flow properties. Also, both phases may contain solvents and/or reactive solvents.

To prepare the emulsions the phenolic resin is melted and, after the optional plasticizers have been added, is generally mixed with an emulsifier, whereupon the latter melts in the resin. It is not necessary for the phenolic resin to be free from water. Thus it may contain water in solution or be in the form of an emulsion of the water-in-oil type. Then water is added, dropwise, generally at 50°–100° C, preferably from 60° to 95° C, the optional protective colloids have been previously dispersed in the water, and the mixture is vigorously stirred until an emulsion of the water-in-oil type is formed. With cooling and continued stirring, water and/or aqueous protective colloid dispersion is added to the emulsion, until, on cooling, the emulsion is converted into an oil-in-water type emulsion. Optionally, this may be followed by homogenisation in an emulsifying apparatus.

Another method of preparing the emulsion consists, for example, of mixing the resin, alone or in admixture with plasticising substances, with the emulsifier, and by stirring it and adding an aqueous solution of the protective colloid, converting it into a coarsely dispersed but pumpable and semi-stable emulsion of the oil-in-water type. This preliminary emulsion can then be processed in an emulsification apparatus to produce a finely dispersed oil-in-water emulsion. The emulsions obtained in this or a similar way are finely dispersed and store well. Their viscosity is generally from 500 and 20,000 cP at 20° C.

The emulsions according to the inventions contain substantially no solvent, free phenol or free formaldehyde. The emulsified, hardenable phenol resins liberate substantially no free phenol and at most only trace quantities of formaldehyde, generally not more than 0.02%, for example 0.005 to 0.02%, on hardening.

These emulsions can be used in many ways including those applications in which phenol resins dissolved in solvents have hitherto been used. They may advantageously also be used where conventional phenolic resins cannot be used owing to the release of large quantities of harmful substances on hardening e.g. in the fields of heat-setting varnishes and heat-setting impregnating agents for textiles, glass fibre, mineral wool, etc. The emulsions may, however, also be used in other fields, for example for air-drying coatings and washing primers. When used as coating materials, the emulsions may, if desired, be provided with pigments.

The following Examples serve to illustrate the new process according to the invention. In the Examples, T indicates parts by weight and all percentages are by weight.

EXAMPLE 1 a. Preparation of a novolak from phenol and formaldehyde

94 T of phenol, 0.94 T of oxalic acid and 50 T of 30% aqueous formaldehyde are refluxed for 3 hours. The volatile components are then removed by heating, initially under normal pressure, then under a water jet vacuum increasing the temperature of the reaction mixture up to 220° C. This temperature is maintained for a further hour. 70 T of a novolak having a melting point of 48° C and free phenol content of 0.1% are obtained.

b. Methylolation

103 T of the novolak prepared above are melted and 30 T of 33% aqueous sodium hydroxide solution and 50 T of water are added. At 50° C, 80 T of 30% aqueous formaldehyde are added and the mixture is stirred until no formaldehyde can be detected by the hydroxylamine hydrochloride test method. 100 T of isobutanol are added and the pH of the mixture is adjusted to a value in the range 5.0 to 6.0 at 40° to 50° C. The mixture is allowed to stand and the aqueous phase is separated. 225 T of a resin solution with a resin content of 58% and a viscosity of 290 cP/20° C, and containing no free phenol or formaldehyde, are obtained. This resin solution (225T) is admixed with 50 T of toluene and, at a maximum temperature of 115° C, subjected to azeotropic distillation, the non-aqueous phase being continuously recycled (hereinafter this process is always termed "recycling"). 4 T of water are separated over a period of 90 minutes. The final solution contains 63% of resin and, at 20° C, has a viscosity of 1200 cP.

To determine whether any decomposition of the product occurs on hardening a resin sample is heated at 180° C for 30 minutes in the pyrolysis apparatus of a gas chromatograph (front column) and the amounts of phenol and formaldehyde produced are determined. No phenol can be detected. 0.08% of formaldehyde, based on the resin content, is split off.

The resin solution is suitable for use for example as a stoving varnish for metal surfaces, e.g. at a baking temperature of 160° to 180° C.

EXAMPLE 2 a. Preparation of a novolak from dimethylol-p.-tert.-butylphenol and phenol

210 T of dimethylol-p.tert.-butylphenol, 564 T of phenol and 200 T of xylene are distilled with recycling at a maximum temperature of 160° C until about 35 T of water have been separated. Subsequently, the volatile components are distilled off, initially at normal pressure, until the temperature of the reaction mixture reaches 200° C and then under reduced pressure for one hour at 220° C. 305 T of a butyl-modified novolak containing less then 0.1% free phenol are obtained.

b. Methylolation

120 T of 33% aqueous sodium hydroxide solution are added to the butyl-modified novolak prepared above. The mixture is cooled to 60° C and cautiously, because of the exothermic reaction, 200 T of 30% aqueous formaldehyde are added portionwise. After stirring for 5 hours no formaldehyde can be detected in the mixture. 100 T of xylene and 120 T of n-butanol are added. The pH of the mixture is adjusted to between 5.0 and 6.0 and, after allowing the mixture to stand the aqueous phase is separated. 580 T of a solution with a resin content of 64% and a viscosity of 320 cP/20° C and containing no free formaldehyde or free phenol are obtained. When the decomposition products on hardening are determind, (as in Example 1) no phenol and only 0.03% of formaldehyde (based on the quantity of resin) are found.

c. Treatment with wood oil

320 T of wood oil and 150 T of toluene are added to the resin solution obtained in (b) and the mixture is distilled with recycling, until a solution with a viscosity of 1200 cP/20° C and a resin content of 65% is obtained. This solution is compatible with petrol, in a 1:1 ratio. 1010 T of resin solution are obtained.

When the decomposition products on hardening are analysed by gas chromatography, no free phenol and only 0.01% of formaldehyde (based on the solid resin) are found.

The resin solution may be used as a plasticised stoving varnish which may be baked at 150° to 200° C. It may be used unpigmented as a clear varnish or may be mixed with pigments. When the baked varnish film is over coated with white or coloured alkyd resins, no yellowing of the top layer of the lacquer occurs, even when hardening has been effected at only 150° C.

EXAMPLE 3

103 T of the novolak prepared according to Example 1a) are reacted as in Example 1b) with formaldehyde. When the formaldehyde has been completely reacted, 25 T of propylene oxide are added and the mixture is stirred for 6 hours at 50° C. The mixtures is neutralised with aqueous sodium hydroxide and dissolved in toluene as in Example 1b). 250 T of a resin solution with a resin content of 63% and a viscosity of 265 cP/20° C, containing no formaldehyde or free phenol, are obtained. On hardening, no phenol or formaldehyde are detected.

The water content of the resin solution is reduced to zero by recycling at reduced pressure at a temperature of up to 40° C, and the solution is then suitable for use as a stoving varnish. By diluting it with ethylene glycol monoethyl ether, a solution with a viscosity of 30 cP/20° C and a solids content of 32% is obtained. This solution is applied to sheet steel by dipping and is then baked at 180° C for 30 minutes. The varnish coating obtained has a layer thickness of 6μm. Addition of plasticizers to the resin solution is not required.

In the impact-cupping test according to Erichsen, the varnish coating withstands a fall of 50cm. It is undamaged after boiling for half an hour in 0.2% acetic acid or ethylene glycol monoethyl ether.

EXAMPLE 4

630 T of the novolak prepared in Example 1a are reacted as in Example 1b with 180 T of 33% aqueous sodium hydroxide solution, 75 T of water and 420 T of 30% aqueous formaldehyde, until no formaldehyde can be detected in the mixture. 175 T of sodium chloroacetate, 30 T of 33% aqueous sodium hydroxide solution and 175 T of water are then added and the mixture is stirred at 50° C, until the sodium hydroxide content is 0.8%. Subsequently 200 T of isobutanol and 120 T of toluene are added and the mixture is neutralised until the pH is 4.5. The aqueous phase is then separated. By heating the reaction mixture up to a maximum temperature of 60° C under reduced pressure, isobutanol and toluene are distilled off. The remaining resin is dissolved in 400 T of ethylene glycol monoethyl ether. 1100 T of a 65% resin solution with a viscosity of 2400 cP/20° C are obtained. 80 T of 25% aqueous ammonia are added to yield a solution which is miscible with or capable of being diluted with water in any ratio. It can be used as a water-soluble lacquer binding agent. A study of the decomposition products on hardening by gas chromatography shows no phenol and only 0.02% of formaldehyde.

EXAMPLE 5

The butyl-modified novolak prepared according to Example 2a is reacted as in Example 2b with formaldehyde until the latter is completely used up. 35 T of allyl chloride are then added and the mixture is stirred at 50° C until the sodium hydroxide content remains constant. 100 T of xylene and 120 T of ethylene glycol monoethyl ether are added to the mixture and the pH is adjusted to between 5.0 and 6.0. The mixture is allowed to stand and the aqueous phase is then removed. The resin solution is dehydrated by vacuum distillation. 600 T of a solution with a resin content of 70% and a viscosity of 520 cP at 20° C are obtained. This resin solution is compatible with long-chained epoxy resins in any ratio and if desired can be used in admixture therewith as a stoving varnish which can be hardened e.g. at temperatures from 170° to 200° C.

Gas chromatographical analysis of the decomposition products on hardening shows no phenol and only 0.05% of formaldehyde.

Comparison Example 1

Preparation of a novolak from phenol and formaldehyde

103 T of the novolak prepared in Example 1a are reacted with formaldehyde in the presence of only 10 T of 33% aqueous sodium hydroxide solution at 80° C. Four hours after the start of the reaction, the mixture gelatinises, with a free formaldehyde content of 0.9%.

The experiment is repeated at 65° C, but the formaldehyde content does not fall below 2.5%. The resin mixture is worked up as described in Example 1b and the cleavage products formed on hardening are determined. No free phenol, but 3.8% of formaldehyde, can be detected.

Comparison Example 2 a. Novolaks with an ortho structure

A novolak with an ortho structure is prepared by refluxing a mixture of 94 T of phenol, 25 T of 30% aqueous formaldehyde and 2 T of magnesium oxide, until, after 2½ hours, all the formaldehyde is used up and the magnesium oxide has completely gone into solution. 50 T of xylene are then added and the mixture is distilled with recycling, until, at a reaction mixture temperature of 170° to 180° C, no more water is separated. Subsequently the volatile components are distilled off, first at normal pressure, then at reduced pressure, and when the temperature of the mixture has reached 220° C it is maintained for an hour. 30 T of a novolak with a melting point of 57° C are obtained. The infra-red spectrum of the product shows a great predominance of ortho-ortho-bonded methylene bridges.

b. Methylolation in the presence of MgO

105 T of the resin are suspended in 20 T of 30% aqueous formaldehyde and 50 T of water. The mixture is heated. No reaction can be observed at temperatures of up to 70° C, but at 80° C reaction occurs and after several hours at 80° C, the mixture gelatinises and a high content of free formaldehyde is detected.

c. Methylolation in the presence of sodium hydroxide solution

105 T of the ortho novolak prepared in (a) are dissolved in 150 T of n-butanol and the magnesium oxide present in the resin is neutralised with dilute hydrochloric acid. After 100 T of 15% aqueous sodium chloride solution have been added, the magnesium chloride is washed out and after allowing the mixture to settle the aqueous phase is removed. This washing process is repeated twice. The solvent is then removed by distillation, initially at normal pressure, then at reduced pressure. 102 T of a novolak with a melting point of 50° C are obtained. This novolak is reacted, as described in Example 1b, with 80 T of 30% aqueous formaldehyde in the presence of 30 T of 33% sodium hydroxide solution and 50 T of water. Within 7 hours at 50° C, the formaldehyde content falls to 2.8% and then stays at this level. Increasing the temperature to accelerate the reaction has no effect on the formaldehyde content but the mixture gelatinises when the temperature reaches 80° C.

Comparison Example 3 a. 2-Step preparation of resol at elevated temperatures

600 T of phenol, 493 T of 30% aqueous formaldehyde and 1 T of 96% sulphuric acid are refluxed at 100° C for 45 minutes. 4.1 T of calcium hydroxide and 210 T of 30% aqueous formaldehyde are then added to the reaction mixture. The mixture is refluxed for a further 45 minutes, after which time the free formaldehyde content is 3.1%. Subsequently, water is distilled off until the melting point of the mixture is about 70° to 75° C and the resin is dissolved in 170 T of ethyl alcohol. A solution with a viscosity of 1320 cP/25° C is obtained. After distillation, the resin solution has a free formaldehyde content of 1.7%, which cannot be reduced even after repeated distillatin. Gas chromatographical analysis of the decomposition products on hardening shows 0.3% of phenol and 2.1% of formaldehyde (both based on the quantity of resin).

b. Test to ascertain whether it is possible to reduce the free formaldehyde content of the novolak prepared in Comparison Example 3a by varying the reaction time but maintaining the same reaction temperature as in Comparison Example 3a The second step of the reaction in Comparison Example 3a is carried out by heating over a longer period than 45 minutes. In a total of 3 tests, after heating for 2½, 3 and 3½ hours, all the mixtures gelatinise, the content of free formaldehyde being 2.3, 1.9 and 2.1% respectively.

EXAMPLE 6

Non-plasticised emulsion a. Methylolation of the novolak

103 T of the novolak prepared according to Example 1a are methylolated as in Example 1b until no formaldehyde can be detected. Subsequently, 26 T of propylene oxide are added and the mixture is stirred for about 3 hours. The pH of the aqueous resin solution is adjusted to 4.5 to 5.0 with sulphuric acid, and the solution is heated to 70° C to improve the separation of the water, and then cooled again to 50° C. An aqueous phase separates out and is carefully removed. The yield of resin solution 215 T with a solids content of 70%.

b. Emulsification without an emulsifier.

167 T of the novolak prepared above are stirred with 60 T of a 10% polyvinylalcohol solution (viscosity 1050 cP/20° C). A coarsely-dispersed emulsion of the oil-in-water type is obtained, with particle sizes of 4 – 20 μ.

From 240 T of this emulsion, a finely-dispersed emulsion of the oil-in-water type, with particle sizes of 1 – 2μ, is obtained by adding at 45°– 55° C, a further 25 T of the 10% polyvinylalcohol solution. The solids content of the emulsion is 50.0% and the viscosity is 10,500 cP/20° C.

c. Emulsification with an emulsifier

The mixture of Example 6b is mixed with 10 T of an 80% solution of a hydroxyalkylatedresinic acid (emulsifier U, Bayer AG.). The coarse emulsion having a particle size of 2 – 10μ is converted into a fine emulsion having a particle size of about 1μ with a solids content of 50.5% and a viscosity of 9500 cP/20° C. Emulsions 6b and 6c contain no free phenol and no formaldehyde. In gas chromatographical investigation to determine the decomposition products formed on hardening, a resin sample is heated for 30 minutes to 180° C in the pyrolysis apparatus of a gas chromatograph (first column) and subsequently the quantities of phenol and formaldehyde liberated are determined. In both emulsions, no phenol and less than 0.05% of formaldehyde can be detected.

The emulsions can be used as stoving varnishes for metal surfaces and be hardened at e.g. 160° to 200° C.

EXAMPLE 7

Plasticised emulsion

215 T of the phenol resin prepared according to Example 6a are mixed with 70 T of an epoxy resin based in 4,4-diphenylolpropane and epichlorohydrin, with an epoxy equivalent weight of 180 to 200, and 70 T of an epoxy resin based on the same substances, with an epoxy equivalent weight of 900 to 1000, and then heated to 80° C. 167 T of the resin mixture are mixed with 75 T of an emulsifier based on a hydroxyalkylated tallow fat alcohol with 25 mol of added ethylene oxide and the mixture is emulsified with vigorous stirring and simultaneous cooling while 50 T of water are slowly added dropwise. When the emulsion is cooled to a temperature between 50° and 60° C, it changes from a water-in-oil to an oil-in-water type. By adding 30 T of a 2% methylcellulose solution (viscosity 6000 cP/20° C) and further cooling, the mixture is re-emulsified with very vigorous stirring. A finely-dispersed emulsion is formed, with a particle size of between 1 and 2μ. The solids content of the emulsion is 54%. The viscosity is 1500 cP/20° C. The emulsion does not contain any free phenol or free formaldehyde. On hareening, no phenol and less than 0.05% of formaldehyde are detectable.

The emulsion can be used as a dipping lacquer by further dilution with water. It yields very elastic lacquer films which are resistant to chemicals. The baking temperature is between 180° and 210° C.

EXAMPLE 8

Emulsion containing a carboxyl group containing resin.

a. Reaction with chloroacetic acid

A butyl-modified novolak according to Example 2a is treated according to 2b until no formaldehyde can be detected in the mixture. To this mixture are added another 120 T of 33% sodium hydroxide solution and 116 T of sodium chloroacetate and 200 T of water. The mixture is stirred until the sodium hydroxide content is 2.1% and it is then adjusted to pH 2.5 with sulphuric acid.

The mixture is allowed to stand and the aqueous phase is then suction filtered. The resin is washed three times with distilled water. 580 T of a resin with a solids content of 73% are obtained.

b. Emulsification

1000 T of the resin prepared according to Example 8a are heated to 80° C and mixed with 40 T of the hydroxyalkylated resin acid used in Example 6c. 450 T of a 5% polyvinylalcohol solution (viscosity 1200 cP/20° C) are added, with gradual cooling and through stirring, whereupon the emulsion changes, at 40° C, from the water-in-oil type to the oil-in-water type. With further vigorous stirring and cooling to 20° C, a finely-dispersed emulsion is obtained with a particle size of between 0.5 and 1.5μ.

The emulsion has a viscosity of 3500 cP/20° C. No free phenol, no free p-tert.butylphenol and no free formaldehyde can be detected therein. When the emulsion is tested for decomposition products on hardening as in Example 6, none of these substances are detected.

The emulsion is suitable for the preparation of stoving lacquers and for impregnating fibre fleeces of mineral or textile fibres, the hardening temperatures used generally being from 150° to 200° C.

We claim:
1. A process for the preparation of a hardenable phenolic resin which is substantially free from unreacted phenol and unreacted formaldehyde and which liberates at most only trace quantities of formaldehyde during a hardening process which comprises reacting
   A. a novolak wherein the molar ratio of phenol(s) to formaldehyde is from 1:0.1 to 1:0.8 containing methylene bridges, being not predominantly cross-linked in the ortho-position and being substantially free from unreacted phenol with
   B. formaldehyde in the presence of from 0.15 to 1 equivalent (based on the number of phenolic hydroxy groups) of a basic catalyst at a temperature of from 20° to 70° C the formaldehyde being applied in an amount sufficient to form a hardenable phenolic resin wherein 2 to 2½ of the three o- and p-positions in the phenolic nuclei are occupied by methylol groups, methylene bridges, alkyl or other substituents.

2. A process as claimed in claim 1 wherein the novolak A) is derived from a mixture of at least one unsubstituted phenol and at least one substituted phenol containing at least one mol of phenol per mol of substituted phenol(s), said substituted phenol(s) is/are phenol(s) substituted by one or more straight-chain or branched alkyl groups containing from 1 to 18 carbon atoms.

3. A process as claimed in claim 1 wherein the molar ratio of phenol(s) to formaldehyde in the novolak (A) is from 1:0.2 to 1:0.7.

4. A process as claimed in claim 1 wherein the unreacted phenol content of the novolak (A) is not more than 1.5% by weight.

5. A process as claimed in claim 1 wherein the methylene bridges in the novolak (A) are bound to the ortho- and para-positions of the phenolic nuclei.

6. A process as claimed in claim 1 wherein at least one of the phenolic or methylol hydroxy groups of the phenolic resin is subsequently partially etherified.

7. A hardenable phenolic resin composition which is substantially free from unreacted phenol and unreacted formaldehyde and which liberates at most only trace quantities of formaldehyde during a hardening process which comprises a liquid phase selected from the group consisting of (a) a solution and (b) an aqueous emulsion of the reaction product of
   A. a novolak wherein the molar ratio of phenol(s) to formaldehyde is from 1:0.1 to 1:0.8 containing methylene bridges, being not predominantly cross-linked in the ortho-position and being substantially free from unreacted phenol with
   B. formaldehyde in the presence of from 0.15 to 1 equivalent (based on the number of phenolic hydroxy groups) of a basic catalyst at a temperature of from 20° to 70° C the formaldehyde being added in an amount such that 2 to 2½ of the three o- and p-positions in the phenolic nuclei are occupied by methylol groups, methylene bridges, alkyl or other substituents.

8. A composition as claimed in claim 7 wherein the aqueous emulsion additionally contains plasticizing substances or a combination thereof with either at least one emulsifying agent alone or a combination thereof with a protective colloid.

9. A composition as claimed in claim 7 which is an adherent layer composition being hardenable by means selected from the groups consisting of (a) thermally and (b) in the presence of an acid catalyst at ambient temperature or at a slightly elevated temperature.

10. A composition as claimed in claim 9 which is a composition for adherent layers in the form selected from the group consisting of coatings and intermediate layers.

* * * * *